(12) United States Patent
Han et al.

(10) Patent No.: US 11,734,840 B2
(45) Date of Patent: Aug. 22, 2023

(54) TARGET TRACKING METHOD, DEVICE, MEDIUM AND APPARATUS

(71) Applicant: BOYAN TECHNOLOGIES (SHENZHEN) CO., LTD, Guangdong (CN)

(72) Inventors: Yuxing Han, Guangdong (CN); Jiangtao Wen, Guangdong (CN); Jisheng Li, Guangdong (CN); Yubin Hu, Guangdong (CN)

(73) Assignee: BOYAN TECHNOLOGIES (SHENZHEN) CO., LTD, Guangdong (CN)

( * ) Notice: Subject to any disclaimer, the term of this patent is extended or adjusted under 35 U.S.C. 154(b) by 176 days.

(21) Appl. No.: 17/235,237

(22) Filed: Apr. 20, 2021

(65) Prior Publication Data
US 2022/0207754 A1 Jun. 30, 2022

(30) Foreign Application Priority Data
Dec. 25, 2020 (CN) .......................... 202011562357.0

(51) Int. Cl.
*G06T 7/292* (2017.01)
*G06T 7/30* (2017.01)
(Continued)

(52) U.S. Cl.
CPC .............. *G06T 7/292* (2017.01); *G06F 18/22* (2023.01); *G06T 3/4038* (2013.01); *G06T 7/248* (2017.01); *G06T 7/30* (2017.01); *G06V 20/46* (2022.01)

(58) Field of Classification Search
CPC ....... G06T 7/292; G06T 3/4038; G06T 7/248; G06T 7/30; G06T 2207/30221;
(Continued)

(56) References Cited

U.S. PATENT DOCUMENTS

2003/0076406 A1\* 4/2003 Peleg .................... G06T 3/4038
382/284
2017/0345162 A1\* 11/2017 Bamba ..................... G06T 7/74
(Continued)

FOREIGN PATENT DOCUMENTS

CN          109033972 A  * 12/2018

OTHER PUBLICATIONS

Dalal N., et al. Histograms of Oriented Gradients For Human Detection, 2005 IEEE Computer Society Conference on Computer Vision and Pattern Recognition (CVPR'05): vol. 1. 2005:886-893.
(Continued)

*Primary Examiner* — Chan S Park
*Assistant Examiner* — Daniel C Chang
(74) *Attorney, Agent, or Firm* — Volpe Koenig

(57) ABSTRACT

The present disclosure relates to a target tracking method, device, medium and apparatus, belongs to the technical field of computers, and can ensure the completeness of tracking. The target tracking method comprises performing object detection on all telephoto image frames captured by telephoto cameras in a multi-camera system, and constructing a detection point set based on object detection result for each frame of the telephoto image; selecting a target tracking point from each detection point set based on the starting tracking point; and connecting the selected target tracking points as a tracking sequence for the starting tracking point.

12 Claims, 15 Drawing Sheets

(51) Int. Cl.
*G06T 7/246* (2017.01)
*G06V 20/40* (2022.01)
*G06T 3/40* (2006.01)
*G06F 18/22* (2023.01)

(58) Field of Classification Search
CPC .......... G06T 2207/30241; G06T 7/246; G06T 5/002; G06T 2200/32; G06T 2207/10016; G06T 2207/20081; G06T 2207/20084; G06K 9/6215; G06V 20/46; G06V 10/62; G06V 20/42; G06N 3/0454; G06N 3/08
See application file for complete search history.

(56) References Cited

U.S. PATENT DOCUMENTS

2021/0358138 A1* 11/2021 Peng ................ G06T 7/136
2021/0365707 A1* 11/2021 Mao ................. H04N 23/80

OTHER PUBLICATIONS

Zhu, Q., et al. Fast Human Detection Using a Cascade of Histograms of Oriented Gradients, 2006 IEEE Computer Society Conference on Computer Vision and Pattern Recognition (CVPR'06): vol. 2. 2006: 1491-1498.

Cao, Z., et al. Openpose: Realtime Multiperson 2d Pose Estimation Using Part Affinity Fields. IEEE Transactions on Pattern Analysis and Machine Intelligence, 2019.

Simon, T., et al. Hand Keypoint Detection in Single Images Using Multiview Bootstrapping, CVPR. 2017.

Cao, Z., et al. Realtime Multiperson 2d Pose Estimation Using Part Affinity Fields, CVPR. 2017.

Wei, S-E., et al. Convolutional Pose Machines, CVPR. 2016.

Pérez, P., et al. Poisson Image Editing [C/OL], SIGGRAPH '03: ACM SIGGRAPH 2003 Papers. New York, NY, USA: Association for Computing Machinery, 2003: 313-318. https://doi.org/10.1145/1201775.882269.

Eventhal, D., et al. Poisson Image Editing Extended [C/OL], SIGGRAPH'06: ACM SIGGRAPH 2006 Research Posters. New York, NY, USA: Association for Computing Machinery, 2006: 78-es. https://doi.org/10.1145/1179622.1179712.

Tanaka, M., et al. Seamless Image Cloning By a Closed Form Solution of a Modified Poisson Problem [C/OL], SA '12: SIGGRAPH Asia 2012 Posters. New York, NY, USA: Association for Computing Machinery, 2012. https://doi.org/10.1145/2407156.2407173.

* cited by examiner

TARGET TRACKING METHOD, DEVICE, MEDIUM AND APPARATUS

FIELD OF THE INVENTION

The present disclosure relates to the field of computers, in particular to a target tracking method, device, medium and apparatus.

BACKGROUND

Due to the limited field of view, object or person tracking by a single camera can only be performed in a limited space, which makes it difficult to obtain a complete trajectory of the motion of the object or person, and the motion process of the object or person can only be recognized by segmented trajectories. When integrating these segmented trajectories, re-identification of the object or person becomes a great challenge and it is difficult to ensure the completeness of the tracking.

SUMMARY

The present disclosure aims to provide a target tracking method, device, medium and apparatus, which can ensure the completeness of tracking.

According to a first embodiment of the present disclosure, a target tracking method is provided, comprising: performing object detection on all telephoto image frames captured by telephoto cameras in a multi-camera system, and constructing a detection point set based on the object detection result for every telephoto image frame; selecting a target tracking point from each detection point set based on the starting tracking point; and connecting the selected target tracking points as a tracking sequence corresponding to the starting tracking point.

According to a second embodiment of the disclosure, there is provided a computer readable storage medium with a computer program stored thereon, and the steps of the method according to the first embodiment of the present disclosure are implemented when the computer program is executed by a processor.

According to a third embodiment of the present disclosure, an electronic apparatus is provided, comprising: a memory with a computer program stored thereon; and a processor configured for executing the computer program in the memory to implement the steps of the method according to the first embodiment of the disclosure.

By adopting the above technical solution, a good tracking performance can be achieved based on the multi-camera system; and not only the tracking video can be output, but also the tracking video can be combined into the wide-angle video as a small window, so as to provide the views of details and large scene at the same time. This capability of full trajectory tracking lays the foundation for applying the multi-camera system in more fields.

Additional features and advantages of the present disclosure will be set forth in the following detailed description.

BRIEF DESCRIPTION OF THE FIGURES

The accompanying figures, which are included to provide a further understanding of the disclosure and to constitute a part of this description, are intended to interpret the present disclosure together with the detailed descriptions below, but do not intend to limit the present disclosure. Wherein.

DETAILED DESCRIPTION OF THE INVENTION

The disclosure is described in detail below in combination with the accompanying figures. It should be understood that the specific embodiments described herein are illustrative and explanatory only and are not intended to limit the present disclosure.

Figure 1:
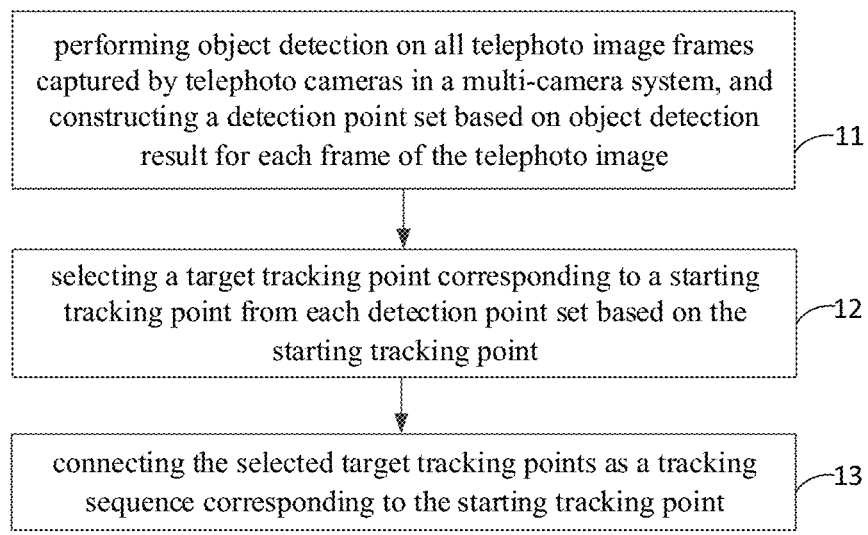
FIG. 1 is a pipeline diagram of the target tracking method according to an embodiment of the present disclosure.

FIG. 1 is a pipeline diagram of the target tracking method according to an embodiment of the present disclosure. As shown in FIG. 1, the method includes the following steps S11 to S13.

Step S11, performing object detection on all telephoto image frames captured by telephoto cameras in a multi-camera system, and constructing a detection point set based on the object detection result for each frame of the telephoto images.

The multi-camera system is a camera system in which wide-angle cameras and a telephoto cameras cooperate with each other. It can not only cover a large scene, but also obtain sufficient precision for tracking.

The object refers to, for example, a person, an object, etc.

Since there are usually multiple objects of the same type in the same frame of the telephoto image, the detection point set herein are all objects of the same type including the tracked object (i.e. the target tracking point hereinafter). For example, assuming that Player A is tracked by using the multi-camera system, since Player B and Player C are involved in the contest at the same time, the detection point set includes detection points for Players A, B and C, while the starting and target detection points referred to hereinafter are referred to as Player A.

For object detection, it may be implemented by using feature extraction algorithms such as neural networks (e.g., OpenPose detection framework), HOG operators, etc.

Taking the OpenPose detection framework as an example, in order to pursue high accuracy of the detection result, a sliding window method can be adopted in an actual detection process to send a telephoto image into for example a 25-point human body model of the OpenPose detection framework for detection, wherein the height $H_b$ of the sliding window can be calculated according to the height $H_h$ of a human body, the height $H_s$ of the imaging sensor of a camera, the overall height $H_i$ of an image, the focal length of a lens and the distance from a camera to the captured person according to the following empirical formula 1-1:

$$H_b = H_i \cdot \frac{f}{D} \cdot \frac{1.5H_h}{H_s} \quad (1\text{-}1)$$

Figure 2:
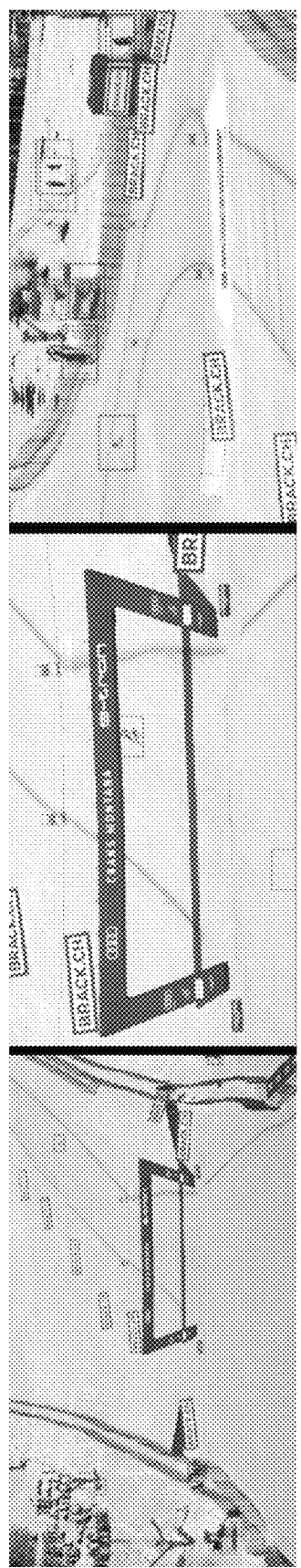
FIG. 2 shows a comparison of detection results for several images with different focal lengths.

After completing 25 key points detection, a triple data {x, y, P} is obtained for each key point, wherein {x, y} is a key point coordinate, and P is a confidence level. The detection result only keeps the key points with enough confidence, resulting in not every person having complete 25-keypoint detection data. In order to facilitate subsequent processing, the coordinates of the effective points detected on each person can be averaged to obtain an average coordinate {$\bar{x}$, $\bar{y}$}. This coordinate {$\bar{x}$, $\bar{y}$} is used to mark the location of the detected person for subsequent tracking processing. FIG. 2 shows a comparison of detection results for several images of different focal lengths and different distances centered on each {$\bar{x}$, $\bar{y}$}.

Step S12, selecting a target tracking point corresponding to a starting tracking point from each detection point set based on the starting tracking point.

With the object detection process in step S11, a detection point set $S_t$ is constructed for each frame t of the video, and then in step S12, a target tracking point $P_t$ is selected from the detection point set $S_t$ and connected with target tracking points from other frames to serve as a tracking sequence. This process requires a given starting tracking point $P_0$ to mark the target to be tracked in the entire video sequence, and the whole process can be divided into intra-camera tracking and inter-camera tracking.

For tracking an intra-camera video sequence, the following algorithm can be adopted to generate a tracking sequence, and the specific algorithm is as follows:

```
Result; P
    = Ø;
Given P_0;
P_f = P_0
    += P_f;
while t ≠ END do
 | S_t = OpenPoseResult;

| I_t = argmin D(P_f, S_t[i]);

| P' = S_t[i_t];
 | | if D(P', P_f) ≤ d_0 then
 | | | M⃗_f = P' - P_f;
 | | | P_f = P';
 | |     += P_f;
 | else
 | | if M⃗_f = = NULL then
 | | |     += P_f;
 | | else
 | | | P_f = P_f + M⃗_f;
 | | |     += P_f;
 | | end
 | end
 | if OutOfBound(P_f) then
 | | return;
 | end
 | t+ = 1;
end
``` wherein, $\mathcal{P}$ represents a finally generated tracking point sequence, comprising target tracking points $P_t$ corresponding to each frame; $P_0$ represents a starting tracking point in a section of video sequence; $P_f$ represents a tracking point from the previous frame in the tracking algorithm; $S_t$ represents a detection point set of each frame; $\vec{M}_f$ represents the motion vector of the previous tracking point; $D(P_1, P_2)$ represents the Euclidean distance between two points $P_1$ and $P_2$.

The basic idea of the tracking algorithm according to an embodiment of the present disclosure is as follows: for each frame of image $I_t$, detecting a detection point set $S_t$ of the frame of image by an object detection algorithm such as OpenPose, then calculating the Euclidean distance between each point $S_t[i]$ in $S_t$ and the previous tracking point $P_f$, finding the point $P'=S_t[i_t]$ with a minimum distance, and calculating the minimum distance $d'=D(P', P_f)$. If the minimum distance is less than a threshold value $d_0$, then it indicates that the distance from the current point P' to the previous tracking point $P_f$ is small enough to be included into $\mathcal{P}$, and the motion vector $\vec{M}_f$ of the current tracking point is calculated at the time of inclusion. If the minimum distance is greater than the threshold value $d_0$, then it indicates that the current point P' might be an error detection point, and $P_f + \vec{M}_f$ is calculated to be included into the tracking sequence $\mathcal{P}$ by means of the continuity of the movement track and following the last motion vector on the basis of $P_f$.

Figure 3:
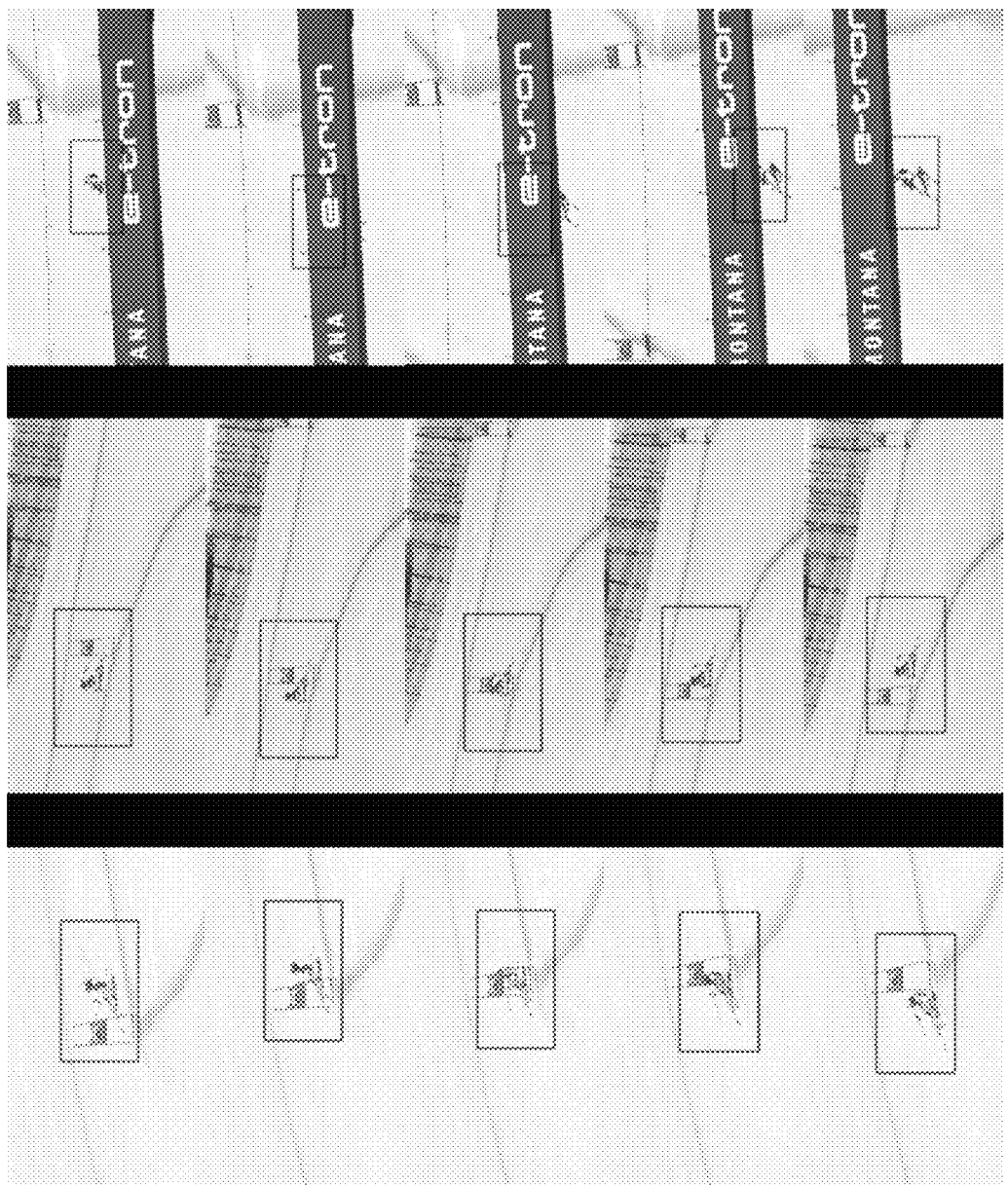
FIG. 3 shows several tracking results.

All frames of the same camera are traversed until the tracking point leaves a picture boundary, namely completing the intra-camera target tracking. FIG. 3 shows several tracking effects, and it can be seen that the algorithm has high robustness for shield and other conditions.

For inter-camera tracking, since the camera coverage areas are substantially interconnected in a multi-camera system, it is possible to continuously track objects leaving the field of view of the previous camera by utilizing the relative position relationship between the cameras.

It is assumed that the camera from which the object is about to leave is recorded as $C_F$, wherein the last tracking point in this camera is recorded as $P_t$, and the image frame in which it is located is the $i^{th}$ frame. The camera into which the object is coming is recorded as $C_N$, $S_{t+1}$ is used to indicate all the detection points in the $(t+1)^{th}$ frame picture of the camera $C_N$. Only by using the position relationship between the cameras, the position of $P_t$ and the position of each point in $S_{t+1}$ can be transformed into the same coordinate system, so as to follow the intra-camera tracking process described above. The homography matrix from the coordinate of camera $C_F$ to the coordinate of wide-angle camera $C_O$ is recorded as $H_{FO}$, and the homography matrix from the coordinate of wide-angle camera $C_O$ to the coordinate of camera $C_N$ is recorded as $H_{ON}$, and the transform from $P_t$ to $P_t'$ in the $C_N$ coordinate system can be represented according to the formula 1-2:

$$\vec{P}_F = [P_{tx}, P_{ty}, 1] \qquad (1\text{-}2)$$
$$\vec{P}_O = H_{FO} \cdot \vec{P}_F^T$$
$$\vec{P}_O = \frac{\vec{P}_O}{P_{Oz}}$$
$$\vec{P}_N = H_{ON} \cdot \vec{P}_O^T$$
$$\vec{P}_N = \frac{\vec{P}_N}{P_{Nz}}$$
$$P_t' = [P_{Nx}, P_{Ny}]$$

wherein, $H_{FO}$ is the homography matrix from the coordinate of the previous telephoto camera to the coordinate of the wide-angle camera in the multi-camera system; $H_{ON}$ is the homography matrix from the coordinate of the wide-angle camera in the multi-camera system to the coordinate of the next telephoto camera; $\vec{P}_F$ is the homogeneous coordinate of the two-dimensional tracking point in the previous telephoto camera, and $P_{tx}$ is the abscissa of the two-dimensional tracking point in the previous telephoto camera; $P_{ty}$ is the ordinate of the two-dimensional tracking point in the previous telephoto camera; $\vec{P}_O$ is the homogeneous coordinate of the two-dimensional tracking point in the wide-angle camera; $\vec{P}_F^T$ is the transposition of $\vec{P}_F$; $P_{Oz}$ is the component z of the homogeneous coordinate $\vec{P}_O$; $\vec{P}_N$ is the homogeneous coordinate of the two-dimensional tracking point in the next telephoto camera; $\vec{P}_O^T$ is the transposition of $\vec{P}_O$; $P_{Nz}$ is the component z of the homogeneous coordinate $\vec{P}_N$; $P_t'$ is the coordinate of the two-dimensional tracking point in the next telephoto camera; and $P_{Nx}$ and $P_{Ny}$ are the abscissa and the ordinate of the two-dimensional tracking point in the next telephoto camera respectively.

Figure 4:
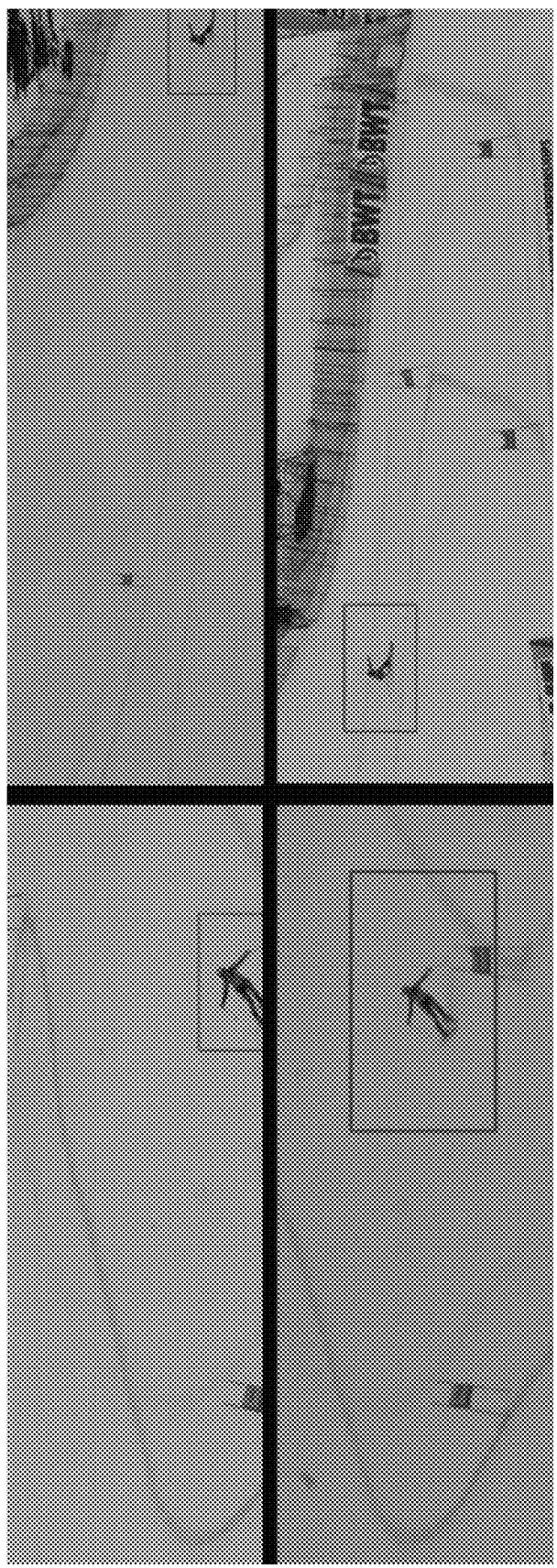
FIG. 4 shows several sets of schematic diagrams of inter-camera tracking.

After $P_t'$ is obtained as a starting tracking point $P_0$ in the intra-camera tracking of camera $C_N$, the target can be continuously tracked in the view of camera $C_N$ along with the intra-camera tracking algorithm described above. FIG. 4 shows several sets of schematic diagrams of inter-camera tracking. Here, the top graph in FIG. 4 shows the tracking result in the view of camera $C_F$, and the bottom graph shows the tracking result in the view of camera $C_N$. As can be seen, by utilizing the relative positions of the cameras in the multi-camera system, the inter-camera tracking can be completed in a simple manner, reducing the overhead of the whole tracking algorithm.

Step S13, connecting the selected target tracking points as a tracking sequence for the starting tracking point.

After the object tracking is finished, candidate boxes can be drawn by taking each tracking point as the center, and the contents inside the candidate boxes can be taken as a one-take video stream. However, the positions of the candidate boxes only depend on the positions of the target detection points, which resulting in unstable trajectory and poor user experience. To stabilize the output video stream, the positions of the candidate boxes are smoothed in the time domain. The whole candidate box smoothing process can be divided into intra-camera candidate box smoothing and inter-camera candidate box smoothing.

Intra-camera candidate box smoothing is described below.

Figure 5:
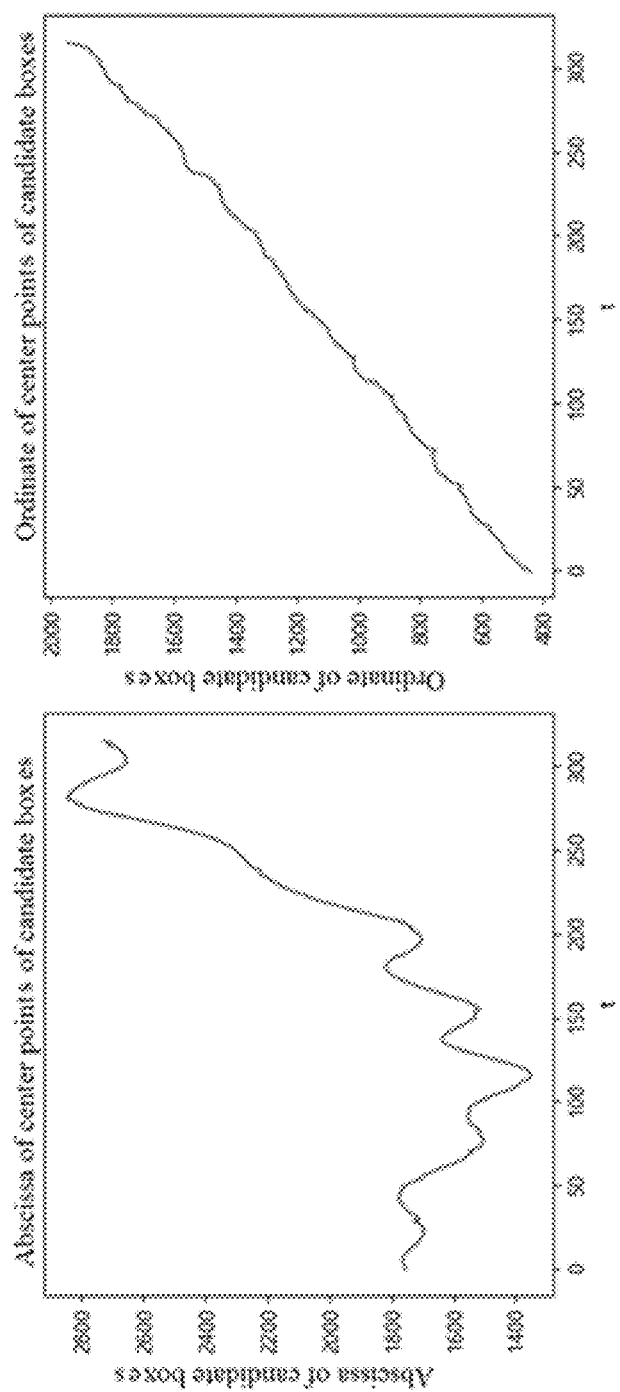
FIG. 5 shows a schematic diagram of candidate box parameters for one of the cameras.

A candidate box is represented by a quadruple $\{C_x, C_y, W, H\}$, wherein $(C_x, C_y)$ represents the position of the center point of the candidate box, and $(W, H)$ represents the width and the height of the candidate box. In a picture of the single camera, the size $(W_0, H_0)$ of the candidate box is fixed, so only the smoothness of the two variables $(C_x, C_y)$ needs to be considered. The parameters of candidate boxes for one of the cameras are plotted as shown in FIG. 5.

Figure 6:
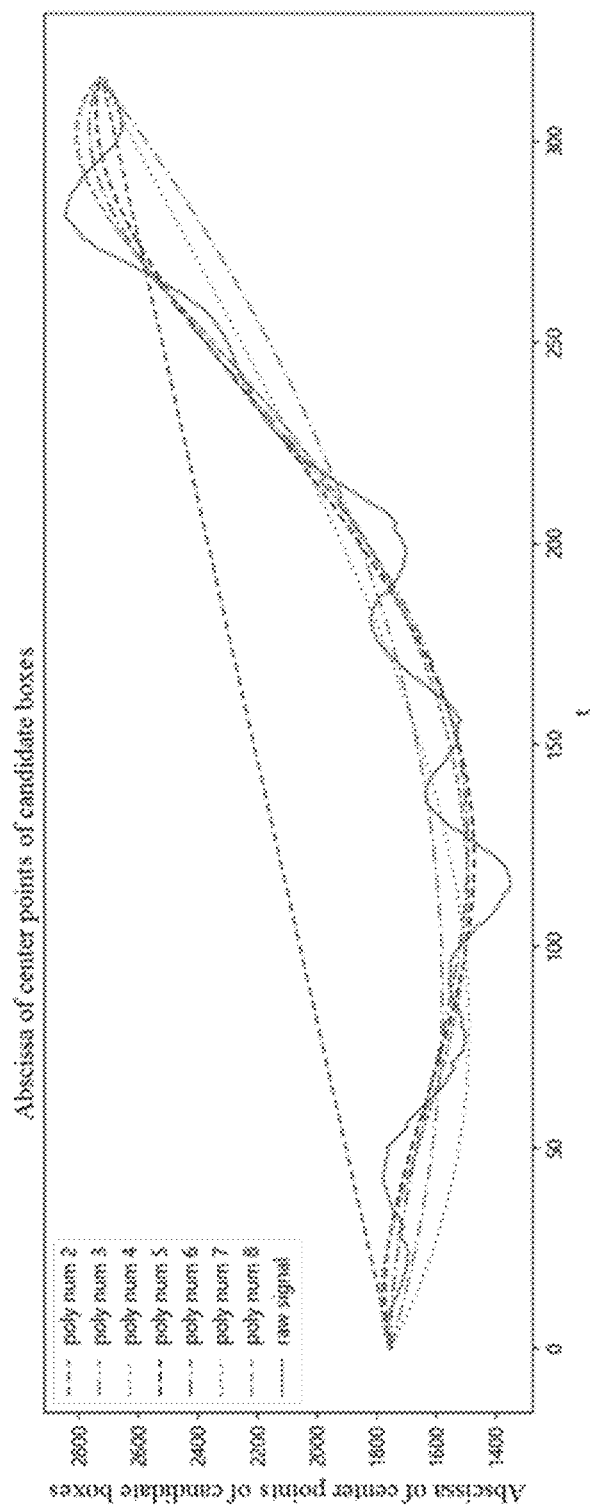
FIG. 6 shows a schematic diagram of polynomial fitting effect as a function of the polynomial order, taking the abscissa of the center points of candidate boxes as an example.

Polynomial fitting is used to stabilize the output trajectory and smooth the two variables $(C_x, C_y)$ respectively. In order to ensure that the initial position and the final position of the candidate box keep the same, the first point and the last point need to be fixed in the process of polynomial smoothing so as to ensure the correctness of the smoothed trajectory. Taking the abscissa of the center points of the candidate boxes as an example, the polynomial fitting result with different polynomial orders is shown in FIG. 6.

Figure 7:
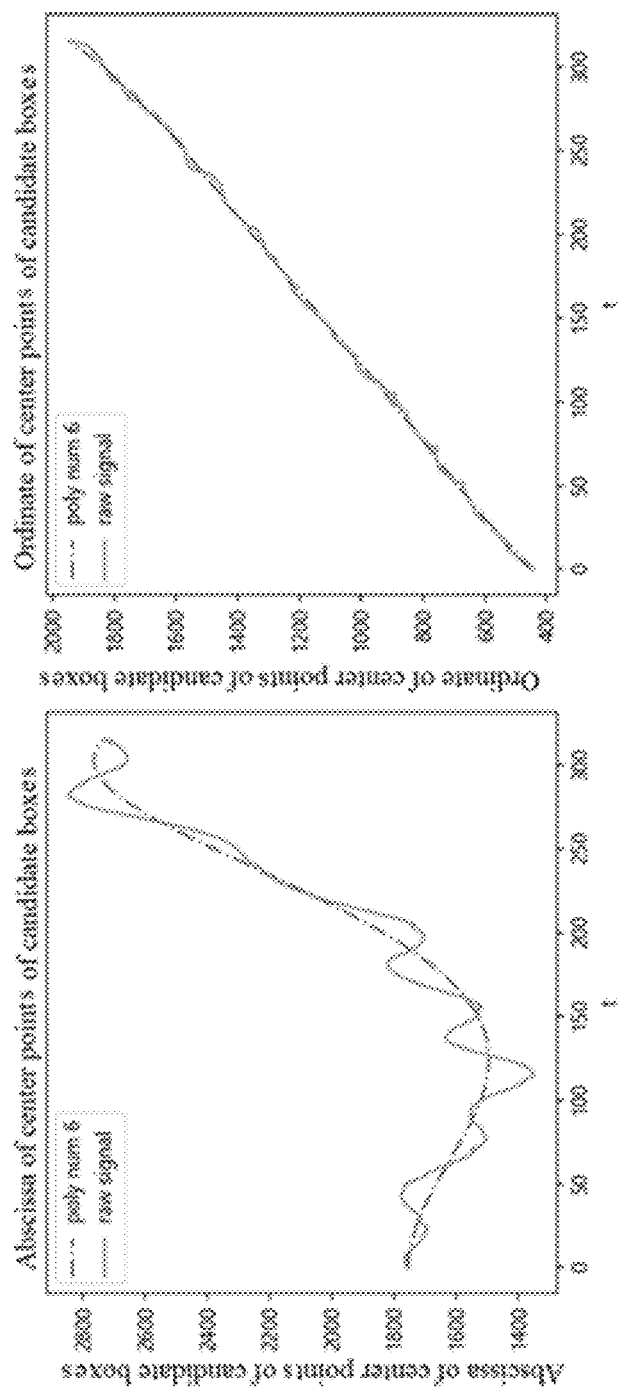
FIG. 7 shows a schematic diagram of the results of polynomial fit smoothing of several variables using a polynomial order n=6.

It can be observed that for this set of data, after the polynomial order reaches 6, the fitting error does not continue to decrease as the order increases, but rather, more obvious bulges tend to appear at the end of the curve at the order n=7, 8. Thus, the polynomial fitting smoothing for each variable with a polynomial order n=6 is selected, and the smoothing result is shown in FIG. 7. As can be seen, after the inter-camera candidate box smoothing, video pictures captured inside the same camera don't shake severely.

Next, the inter-camera candidate box smoothing is described.

When the tracking target moves into the view of camera $C_N$ from the view of camera $C_F$, if the focal lengths of the two cameras are the same, the content of the candidate box is directly displayed without additional operations. If the cameras have different focal lengths, the camera switch results in sudden change of the object size. In order to solve this problem, intra-camera smoothing needs to be implemented during the focal length switch, transforming the sudden focal length change into a slowly gradual focal length change.

The focal lengths of the two cameras are respectively represented by $f_F$ and $f_N$. Assuming that the switch to a video picture of $C_N$ happens at the $t^{th}$ frame and it is expected to complete the transition of a focal length within N frames, the sizes of the candidate boxes from frame t to t+N of the camera $C_N$ need to be adjusted according to the following equation 1-3:

$$\forall i \in [t, t+N] \qquad (1\text{-}3)$$
$$W_i = W_0 \cdot \frac{f_F}{f_N}^{-\frac{N-i+t}{N}}$$
$$H_i = H_0 \cdot \frac{f_F}{f_N}^{-\frac{N-i+t}{N}}$$

wherein, t is a video frame sequence number of the next telephoto camera at the camera switch moment; N is the number of transition video frames at the camera switch moment; i is the traversing sequence number from t to N; $W_i$ is the width of the candidate box in the $i^{th}$ frame; $W_0$ is the width of the candidate box in the previous telephoto camera picture before the switch; $f_F$ is the focal length of the previous telephoto camera; $f_N$ is the focal length of the next telephoto camera; $H_i$ is the height of the candidate box in the $i^{th}$ frame; and $H_0$ is the height of the candidate box in the previous telephoto camera picture before the switch.

When i=t, $$W_i = W_0 \cdot \frac{f_F}{f_N}.$$

Figure 8:
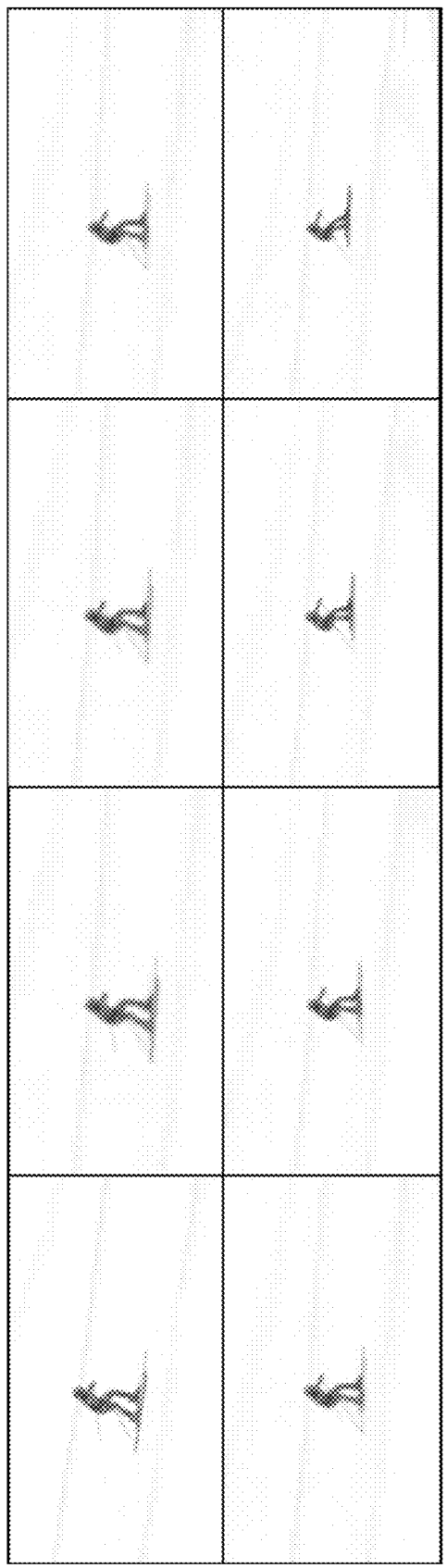
FIG. 8 shows a schematic diagram of the inter-camera smoothing effect.

The candidate box size is changed in order to match the focal switch. When i=t+N, $W_i=W_0$, and the candidate box size changes to a normal state. When an intermediate value is taken for i, the candidate box size slowly changes at a negative exponential change rate. A transitional effect of N=10 (the transition order is from left to right, and from top to bottom) is shown in FIG. 8, wherein the first frame is taken from $C_F$ and last seven frames are taken from $C_N$, it can be seen that the size of the athlete is changing gradually and there is no more sudden change. For switching between cameras with different focal lengths, the proposed method can achieve a good smoothing effect on the candidate box.

By adopting the technical solution, a good tracking effect can be realized with the multi-camera system. Not only the tracking video can be directly output, but also can be combined into the wide-angle video as a small window so as to provide the views of details and large scene at the same time. This capability of full trajectory tracking lays the foundation for the application of the multi-camera system in more fields.

For sports such as alpine skiing, players can only complete the competition one after the other for safety reasons, and cannot compete with each other. This makes it difficult for athletes to compare the differences between themselves and champion players in path selection, specified actions and so on. However, according to the embodiment of the disclosure, the problem can be solved. That is, by combining the cooperative tracking algorithm, the competition process of two athletes can be combined into the same picture, and the process of "competition on the same stage" of the two athletes can be completely tracked to provide important reference for the training of the athletes.

In the following sections, 'same-box comparison' will be used to describe the effect of "competition on the same stage". In order to achieve such same-box comparison, a candidate box sequence obtained by using the tracking algorithm described above is required:

$\chi_A(t)=[X_{A1}(t),X_{A2}(t),X_{A3}(t),X_{A4}(t)]$ $\chi_B(t)=[X_{B1}(t),X_{B2}(t),X_{B3}(t),X_{B4}(t)]$ (2-1)

wherein, subscripts A and B are used to distinguish two players, $X_{A1}(t)$ is used to refer to the candidate box sequence in the player's video 1, and so on. Each candidate box is represented by a quadruple $\{C_x, C_y, W, H\}$. In order to adjust the player's relative position, there could be a delay between the sequences $\chi_A(t)$ and $\chi_B(t)$, which can be represented by $T_0$. Then, in order to synthesize the same-box comparison, the contents in each group of candidate boxes $X_{Ai}(t)$, $X_{Bi}(t+T_0)$ need to be processed to obtain a composite candidate box $X_i(t)$.

Overall, the same-box synthetic approach according to embodiments of the present disclosure includes stitching the image patch $P_{Bi}(t+T_0)$ of image $I_{Bi}(t+T_0)$ corresponding to the candidate box $X_{Bi}(t+T_0)$ into the image $I_{Ai}(t)$ corresponding to $X_{Ai}(t)$ so as to obtain a composite image $I_i(t)$; producing a composite candidate box $X_i(t)$ according to the positions of the two candidate boxes, and selecting corresponding content from $I_i(t)$ according to the candidate box $X_i(t)$ to serve as output.

Image stitching should be completed before all other steps. In order to appropriately stitch the image patch $P_{Bi}(t+T_0)$ into image $I_{Ai}(t)$ and achieve excellent same-box comparison effect, the image stitching can be split into two steps.

The first step is coordinate alignment.

Figure 9:
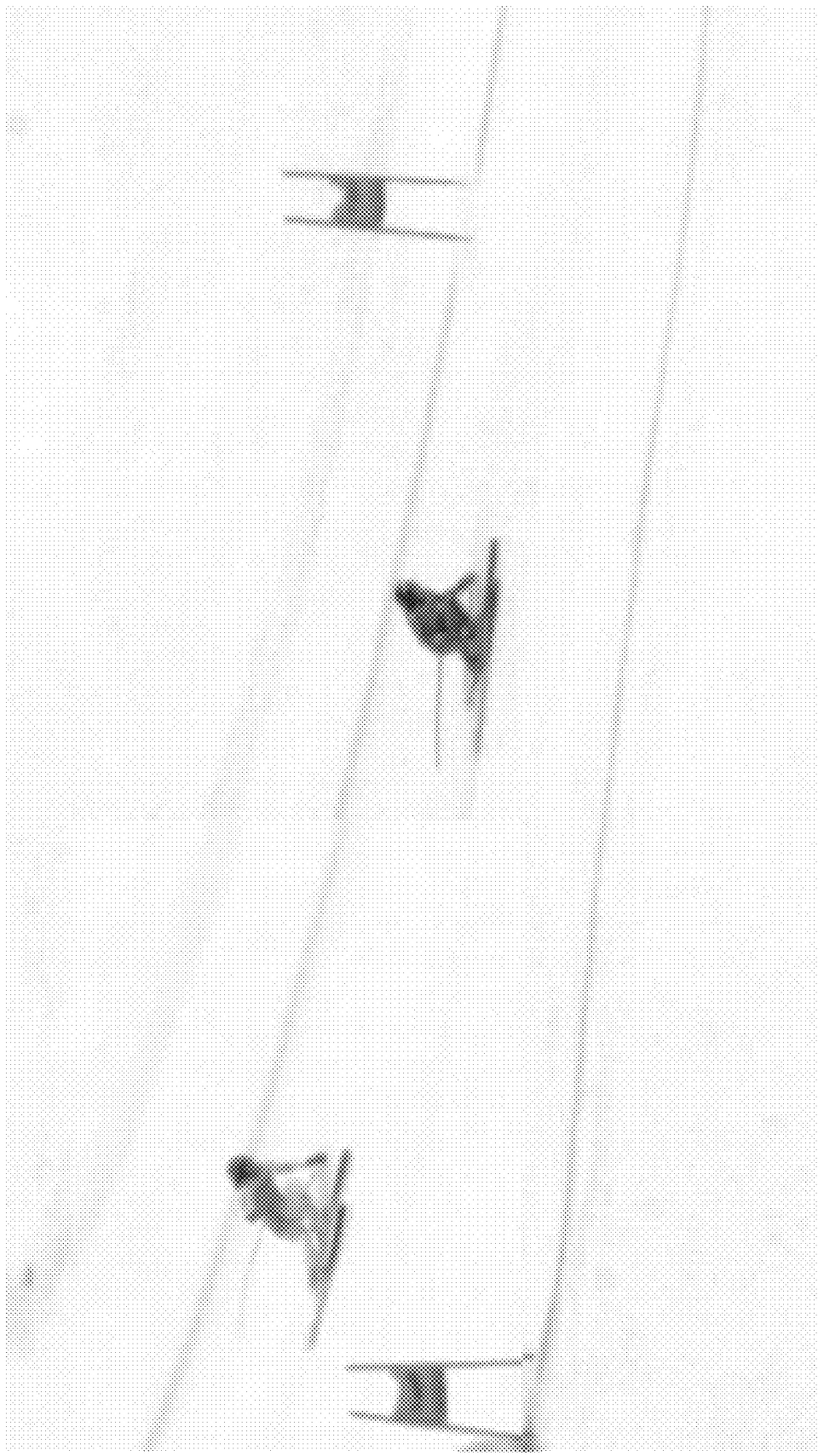
FIG. 9 shows a schematic diagram showing the effect of direct stitching of the image patch defined by candidate box.

In the same camera's field of view, the coordinates of candidate boxes $X_{Ai}(t)$ and $X_{Bi}(t+T_0)$ am in the same coordinate system, so coordinate transformation is not needed. However, the camera is not stable enough during the shooting process, slight position differences exist in two players' videos. If the image patch $P_{Bi}(t+T_0)$ is directly stitched into image $I_{Ai}(t)$, a slight misalignment occurs as shown in FIG. 9. This misalignment is challenging for the subsequent stitching algorithms.

Figure 10:
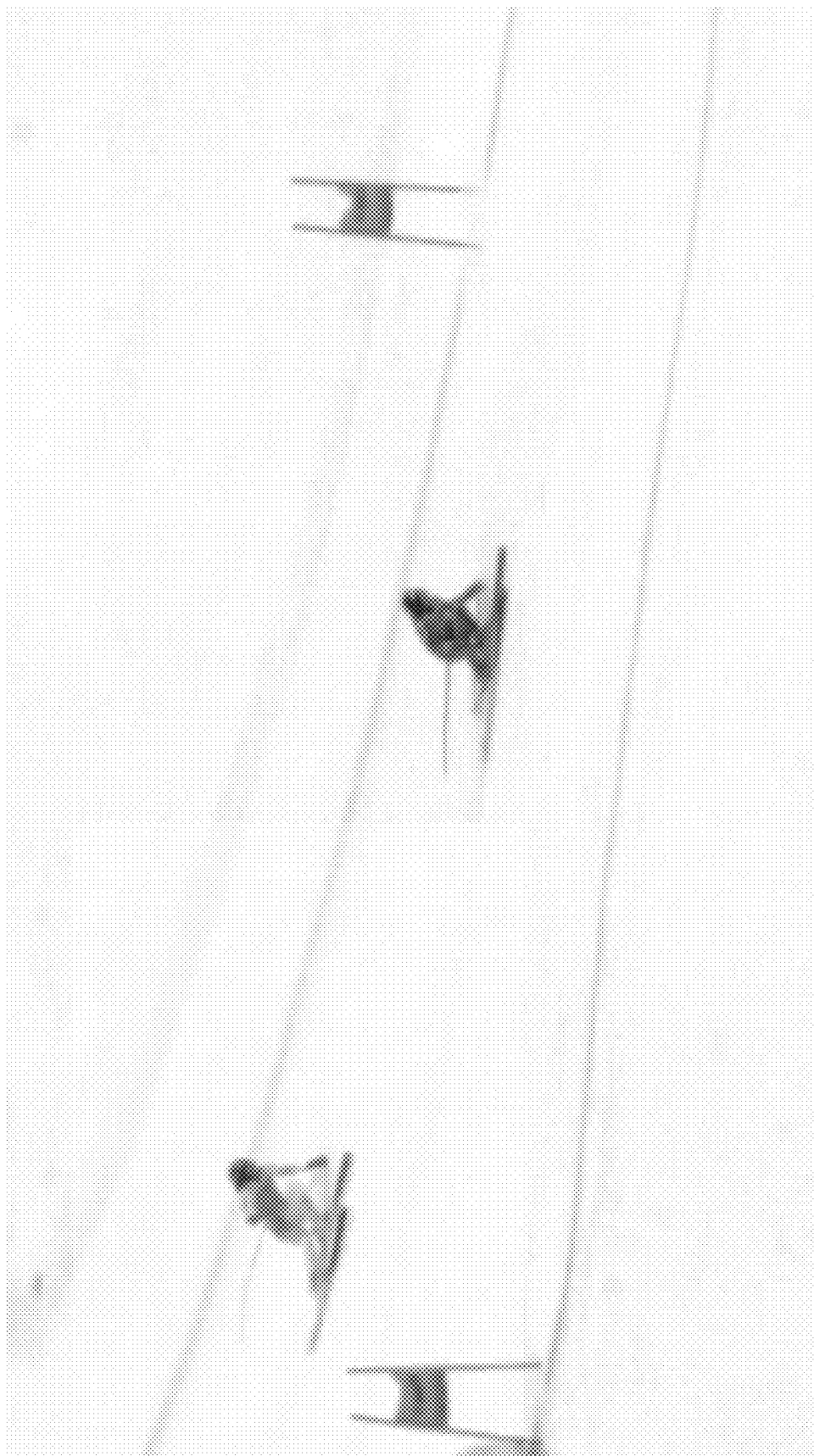
FIG. 10 shows a schematic diagram of the stitching effect after global alignment.

To solve this problem, the frame $I_{Bi}(t+T_0)$ should be aligned with $I_{Ai}(t)$. The SIFT operator is used to extract and match the features of the two images, and these pairs of matching points are used to compute the homography mapping matrix $H_{BA}$. An image $I'_{Bi}(t+T_0)$ is obtained by mapping $I_{Bi}(t+T_0)$ with $H_{BA}$. A new image patch $P'_{Bi}(t+T_0)$ is selected from image $I'_{Bi}(t+T_0)$ by using the candidate box $X_{Bi}(t+T_0)$, and stitched into image $I_{Ai}(t)$. The stitching effect after the coordinate alignment is shown in FIG. 10.

The second step is seamless stitching.

Figure 11:
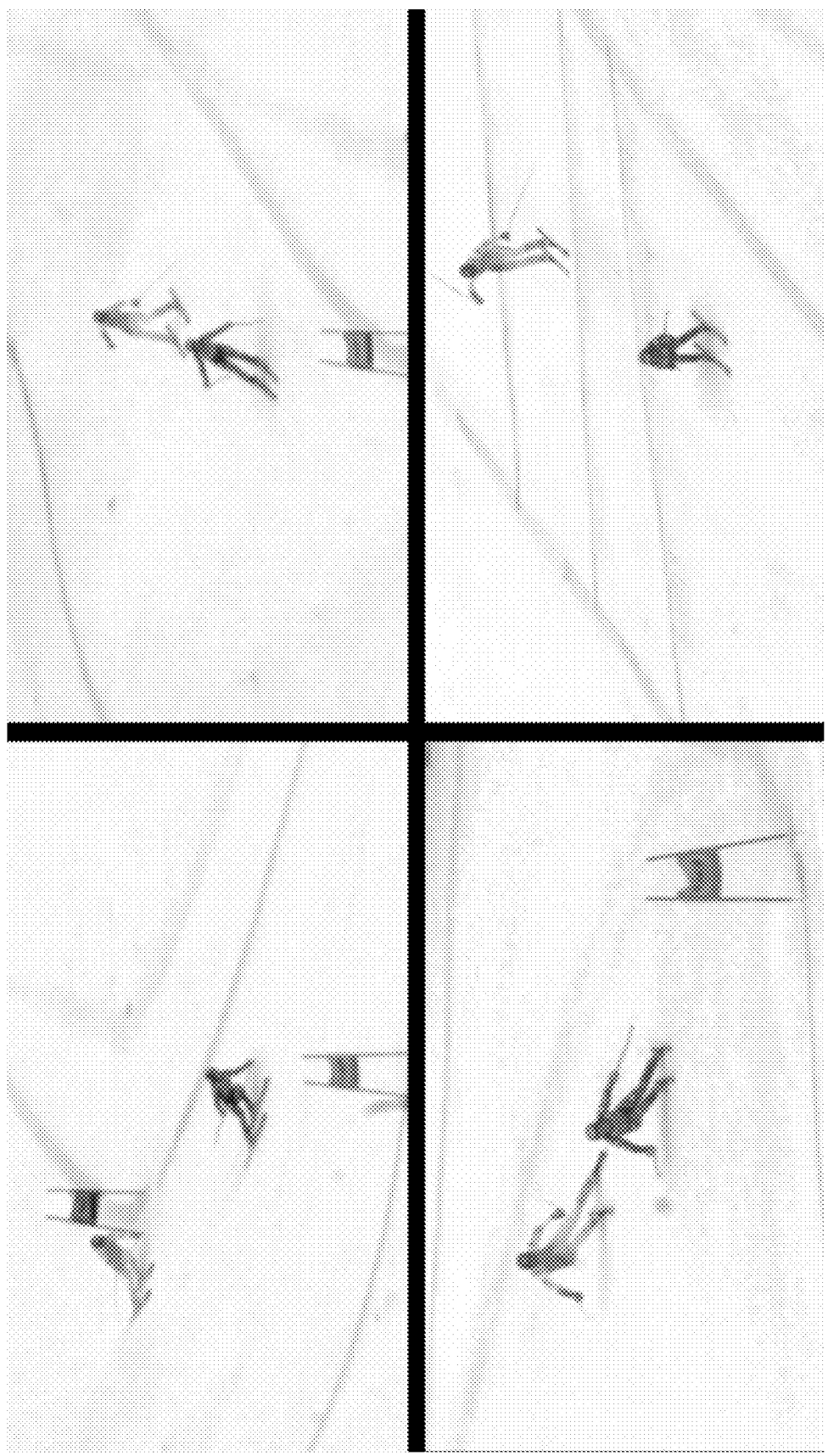
FIG. 11 shows a schematic diagram of the stitching effect with Poisson Image Editing.

Simply stitching $P'_{Bi}(t+T_0)$ into the corresponding position of image $I_{Ai}(t)$ results in two problems, that are, stitching seams and occlusions of athletes. To solve these two problems, Poisson Image Editing is utilized for post-processing to achieve excellent stitching effect for most conditions. FIG. 11 shows a schematic diagram of the stitching effect after Poisson Image Editing.

Through the two-step stitching process, two athletes can be well stitched into together. Finally, the composite box should be calculated. Take the smallest bounding box enveloping the two candidate boxes $X_{Ai}(t)$ and $X_{Bi}(t+T_0)$, and complement the size of the bounding box by the aspect ratio of 16:9. The resulting composite box contents are shown in FIG. 11.

Figure 12:
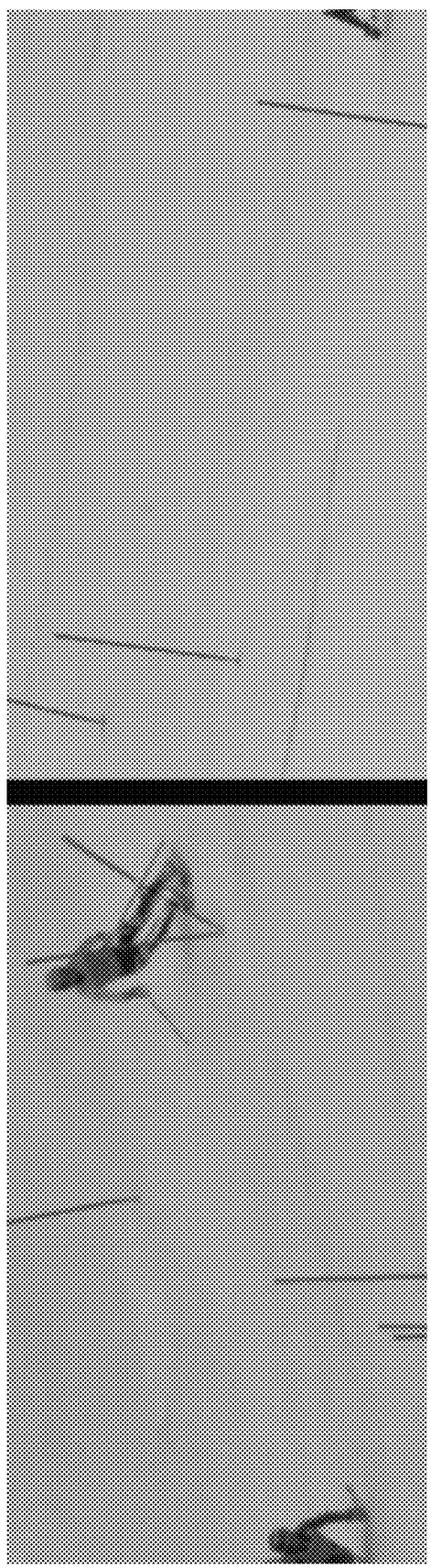
FIG. 12 shows a schematic diagram showing the result of over-smoothing the candidate boxes.

After the seamless stitching described above, the final candidate box sequence (t) is obtained. However, if the smoothing operation as described in step S13 is directly performed on this sequence, the problem shown in FIG. 12 is likely to occur, that is, since the size of the candidate box deviates from the actual need due to excessive smoothing, the athlete cannot be completely framed, leading to incomplete figures. This problem is mainly caused by over-smoothing the sin of candidate boxes. The smoothing method of polynomial fitting can't cope with the sharp changes in the candidate box size (see FIG. 12) even if the polynomial order is adjusted to be super high. When a large candidate box is needed, the candidate box given by the smooth result could be small, so the athlete cannot be completely framed.

This problem does not occur in single person tracking, because the candidate boxes in single person tracking are all player-centered, and slight changes in the size of the candidate boxes do not affect the completeness of the figures. In multi-person comparison synthesis, however, the candidate boxes am no longer player-centered, so the athletes arc likely to locate at the edge of the picture. If the size of the candidate box changes in this case, incomplete characters are easily to be left inside the cropped frame.

Figure 13:
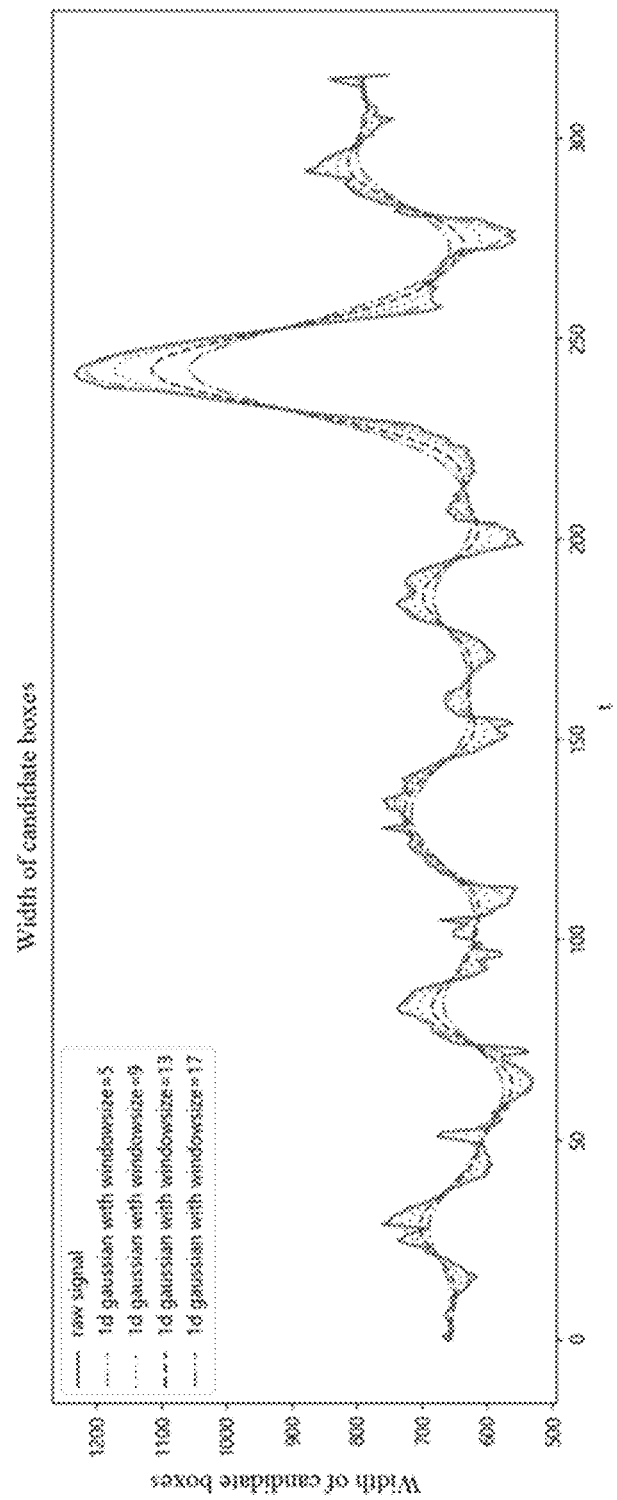
FIG. 13 shows a schematic diagram of the experimental results obtained after filtering operations using Gaussian filters of different window lengths for a captured 25 fps video material.
Figure 14:
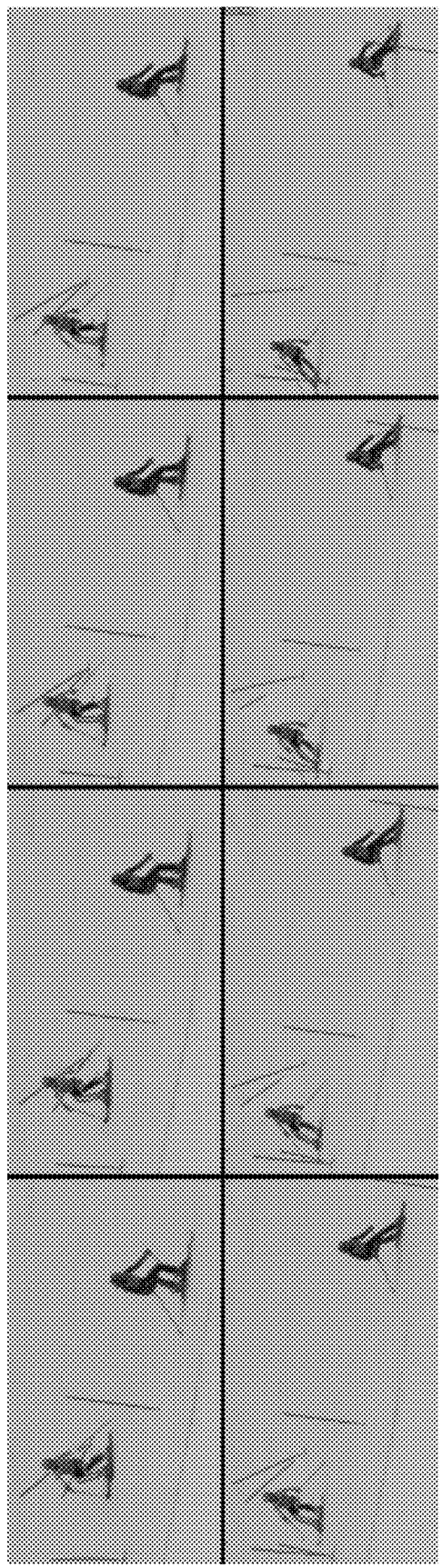
FIG. 14 shows a schematic diagram of motion comparison tracking effect.

In order to avoid the above situation, Gaussian filtering can be used for smoothing, that is, the center points of the composite boxes can be extracted as a tracking point sequence; and Gaussian filtering can be performed on the tracking point sequence to smooth the composite box sequence. Thus, the filtering operation remove the unnecessary view shaking in the output video while keeping the overall trajectory trend. FIG. 13 shows a schematic diagram of the results obtained after filtering operations using Gaussian filters of different window lengths for a captured 25 fps video. The results show that the window length of 13 is appropriate to be selected for filtering. FIG. 14 shows a schematic diagram of motion comparison tracking effect.

Figure 15:
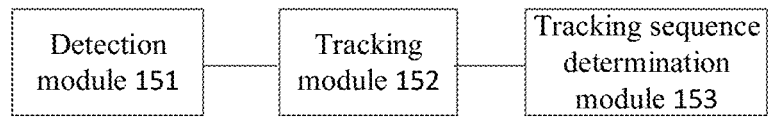
FIG. 15 shows a block diagram of a target tracking device according to an embodiment of the disclosure.

FIG. 15 shows a block diagram of the target tracking devices according to an embodiment of the present disclosure. As seen in FIG. 15, the target tracking devices include a detection module 151 configured for performing object detection on all telephoto image frames shot by the telephoto cameras in a multi-camera system, and constructing detection point sets based on the object detection results for each frame of the telephoto images; a tracking module 152 configured for selecting a target tracking point from each detection point set based on the starting tracking point; and a tracking sequence determination module 153 configured for connecting the selected target tracking points as a tracking sequence for the starting tracking point.

By adopting the above technical solution, a good tracking effect can be achieved with the multi-camera system; and not only the tracking video can be directly output, but also can be combined into the wide-angle video as a small window so as to provide the views of details and large scene at the same time. This capability of full trajectory tracking lays the foundation for the application of the multi-camera system in more fields.

Optionally, for intra-camera tracking of each of the telephoto cameras in the multi-camera system, selecting a target tracking point from each detection point set based on the starting tracking point comprises: determining the target tracking point in a next frame of the telephoto image based on the Euclidean distance between each detection point in the next frame of the telephoto image of the telephoto camera and the target tracking point in the previous frame of the telephoto image.

Optionally, determining the target tracking point in the next frame of the telephoto image based on the Euclidean distance between each detection point in the next frame of the telephoto image of the telephoto camera and the target tracking point in the previous frame of the telephoto image includes:

if a minimum Euclidean distance in the Euclidean distances between each detection point in the next frame of telephoto image of the telephoto camera and the target tracking point in the previous frame of telephoto image is less than a preset threshold value, taking the detection point corresponding to the minimum Euclidean distance as the target tracking point in the next frame of telephoto image, and calculating a motion vector between the detection point corresponding to the minimum Euclidean distance and the target tracking point in the previous frame of telephoto image; and if the minimum Euclidean distance in the Euclidean distances between each detection point in the next frame of the telephoto image of the telephoto camera and the target tracking point in the previous frame of the telephoto image is greater than the preset threshold value, determining the target tracking point in the next frame of the telephoto image based on the target tracking point in the previous frame of the telephoto image and the motion vector thereof.

Optionally, for inter-camera tracking in the multi-camera system, the tracking module 152 is further configured for: converting the position of the target tracking point of the previous telephoto camera to the coordinate system of the next telephoto camera by utilizing the relative position relationship among the telephoto cameras so as to obtain the starting tracking point of the intra-camera tracking of the next telephoto camera.

Optionally, the converting the position of the target tracking point of the previous telephoto camera to the coordinate system of the next telephoto camera by utilizing the relative position relationship among the telephoto cameras so as to obtain the starting tracking point of the intra-camera tracking of the next telephoto camera is achieved by utilizing the following formula:

$$\vec{P}_F = [P_{tx}, P_{ty}, 1]$$
$$\vec{P}_O = H_{FO} \cdot \vec{P}_F^T$$
$$\vec{P}_O = \frac{\vec{P}_O}{P_{Oz}}$$
$$\vec{P}_N = H_{ON} \cdot \vec{P}_O^T$$
$$\vec{P}_N = \frac{\vec{P}_N}{P_{Nz}}$$
$$P'_t = [P_{Nx}, P_{Ny}]$$

wherein, $H_{FO}$ is the homography matrix from the coordinate of the previous telephoto camera to the coordinate of the wide-angle camera in the multi-camera system; $H_{ON}$ is the homography matrix from the coordinate of the wide-angle camera in the multi-camera system to the coordinate of the next telephoto camera; $\vec{P}_F$ is the homogeneous coordinate of the two-dimensional tracking point in the previous telephoto camera, and $P_{tx}$ is the abscissa of the two-dimensional tracking point in the previous telephoto camera; $P_{ty}$ is the ordinate of the two-dimensional tracking point in the previous telephoto camera; $\vec{P}_O$ is the homogeneous coordinate of the two-dimensional tracking point in the wide-angle camera; $\vec{P}_F^T$ is the transposition of $\vec{P}_F$; $P_{Oz}$ is the component z of the homogeneous coordinate $\vec{P}_O$; $\vec{P}_N$ is the homogeneous coordinate of the two-dimensional tracking point in the next telephoto camera; $\vec{P}_O^T$ is the transposition of $\vec{P}_O$; $P_{Nz}$ is the component z of the homogeneous coordinate $\vec{P}_N$; $P'_t$ is the coordinate of the two-dimensional tracking point in the next telephoto camera; and $P_{Nx}$ and $P_{Ny}$ are the abscissa and the ordinate of the two-dimensional tracking point in the next telephoto camera respectively.

Optionally, the connecting the selected target tracking points as a tracking sequence for the starting tracking point includes: drawing candidate boxes by taking each target tracking point as a center, and smoothing the candidate boxes to obtain a tracking sequence for the starting tracking point.

Optionally, for the intra-camera tracking of each of the telephoto cameras in the multi-camera system, the smoothing the candidate boxes includes smoothing the candidate box by polynomial fitting.

Optionally, for inter-camera tracking in the multi-camera system, the smoothing the candidate boxes includes adjusting the size of the candidate boxes of the next telephoto camera based on the focal lengths of the previous telephoto camera and the next telephoto camera.

Optionally, the size of the candidate boxes of the next telephoto camera is adjusted by the following equation:

$$\forall\, i \in [t, t+N]$$
$$W_i = W_0 \cdot \frac{f_F}{f_N}^{-\frac{N-i+t}{N}}$$
$$H_i = H_0 \cdot \frac{f_F}{f_N}^{-\frac{N-i+t}{N}}$$

wherein, t is a video frame sequence number of the next telephoto camera at the camera switch moment; N is the number of transition video frames at the camera switch moment; i is the traversing sequence number from t to N; $W_i$ is the width of the candidate box in the $i^{th}$ frame; $W_0$ is the width of the candidate box in the previous telephoto camera picture before the switch; $f_F$ is the focal length of the previous telephoto camera; $f_N$ is the focal length of the next telephoto camera; $H_i$ is the height of the candidate box in the $i^{th}$ frame; and $H_0$ is the height of the candidate box in the previous telephoto camera picture before the switch.

Optionally, the device further includes a synthesis module configured for synthesizing the tracking sequences of different objects into the same picture.

Optionally, the synthesizing the tracking sequences of different objects into the same picture includes: performing coordinate alignment on the tracking sequences of different objects; and seamlessly stitching the tracking sequences after the coordinate alignment into the same picture.

Optionally, the synthesis module is also configured for extracting the center points of the composite box sequence as a tracking point sequence; and performing Gaussian filtering on the tracking point sequence, and performing smooth processing on the composite box sequence.

With regard to the device in the above-described embodiments, specific manners in which each module performs its operations have been described in detail in connection with the embodiments of the method, and will not be described in detail herein.

Figure 16:
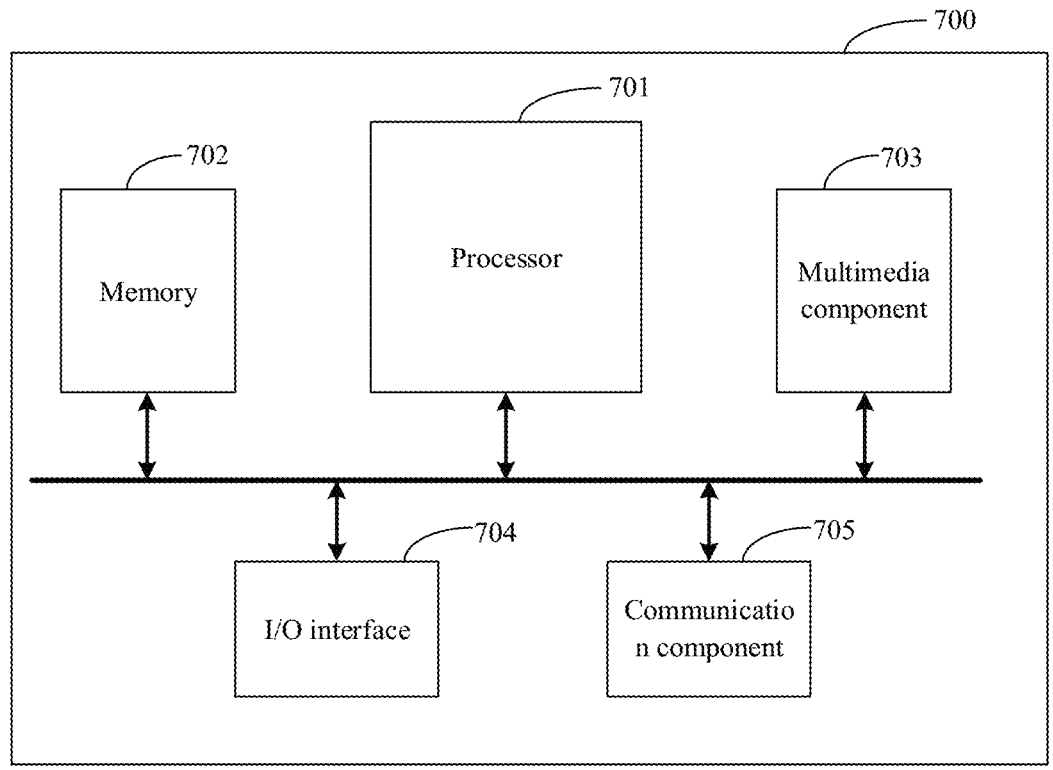
FIG. 16 shows a block diagram of an electronic apparatus according to an exemplary embodiment.

FIG. 16 is a block diagram of an electronic apparatus 700 according to an exemplary embodiment. As shown in FIG. 16, the electronic apparatus 700 may include a processor 701 and a memory 702. The electronic apparatus 700 may also include one or more of a multimedia component 703, an input/output (I/O) interface 704, and a communication component 705.

Therein, the processor 701 is used to control the overall operation of the electronic apparatus 700 to perform all or part of the steps of the object tracking method described above. The memory 702 is used to store various types of data to support the operation at the electronic apparatus 700, which may include, for example, instructions for any application or method for operating on the electronic apparatus 700, as well as application-related data, such as contact data, transmitted and received messages, pictures, audio, video, etc. The memory 702 may be implemented by any type of volatile or non-volatile storage device or combination thereof, such as static random access memory (SRAM), electrically erasable programmable read-only memory (EE-PROM), erasable Programmable Read-Only Memory (EPROM), Programmable Read-Only Memory (PROM), Read-Only Memory (ROM), magnetic memory, flash memory, magnetic or optical disk. The multimedia component 703 may include a screen and an audio component. Where the screen may be, for example, a touch screen, the audio component is used to output and/or input audio signals. For example, the audio component may include a microphone for receiving external audio signals. The received audio signal may be further stored in the memory 702 or transmitted via the communication component 705. The audio assembly further includes at least one speaker for outputting an audio signal. The I/O interface 704 provides an interface between the processor 701 and other interface modules, which may be keyboards, mice, buttons, etc. These buttons may be virtual buttons or entity buttons. The communication component 705 is used for wired or wireless communication between the electronic apparatus 700 and other devices. Wireless communication includes such as Wi-Fi, Bluetooth, Near Field Communication (NFC), 2G, 3G, or 4G, or a combination of one or more thereof. Therefore, the corresponding communication component 705 may include a Wi-Fi module, a Bluetooth module and an NFC module.

In an exemplary embodiment, the electronic apparatus 700 may be implemented by one or more Application Specific Integrated Circuits (ASICs), Digital Signal Processors (DSPs), Digital Signal Processing Devices (DSPD), Programmable Logic Devices (PLD), Field Programmable Gate Arrays (FPGA), controllers, microcontrollers, microprocessors or other electronic components, and is used for executing the target tracking method.

In another exemplary embodiment, there is also provided a computer-readable storage medium including program instructions that, when executed by a processor, implement the steps of the above-described target tracking method. For example, the computer-readable storage medium may be a memory 702 including program instructions executable by the processor 701 of the electronic apparatus 700 to implement the target tracking method.

Although the preferred implementations of the disclosure have been described in detail with reference to the accompanying figures, the disclosure is not limited to the specific details of the above-described embodiments, and various simple modifications of the disclosed technical solutions can be made within the scope of the technical concept of the present disclosure, which are within the scope of the disclosure.

It should be further understood that each particular feature described in the above-described implementations may be combined in any suitable manner without conflicts. To avoid unnecessary repetitions, the disclosure does not further describe various possible combinations.

In addition, any combination of the various implementations of the disclosure may be made without departing from the spirit of the disclosure, which should also be regarded as contents of the disclosure.

The invention claimed is:

1. A target tracking method, comprising:
performing object detection on all telephoto image frames captured by telephoto cameras in a multi-camera system, and constructing a detection point set based on object detection result for each frame of the telephoto images;
selecting a target tracking point for an object-to-be-tracked from each detection point set based on a starting tracking point for the object-to-be-tracked, wherein the starting tracking point is a starting position of the object-to-be-tracked in a video sequence of the telephoto cameras;
connecting the selected target tracking points as a tracking sequence for the starting tracking point;
wherein for intra-camera tracking of each of the telephoto cameras in the multi-camera system, the selecting a target tracking point for an object-to-be-tracked from each detection point set based on a starting tracking point for the object-to-be-tracked comprises: determining the target tracking point for the object-to-be-tracked in a next frame of the telephoto image based on Euclidean distance between each detection point in the next frame of the telephoto image of the telephoto camera and the target tracking point for the object-to-be-tracked in a previous frame of the telephoto image;
wherein the determining the target tracking point in a next frame of the telephoto image based on Euclidean distance between each detection point in the next frame of the telephoto image of the telephoto camera and the target tracking point in a previous frame of the telephoto image comprises:
if the minimum Euclidean distance in the Euclidean distances between each detection point in the next frame of telephoto image of the telephoto camera and the target tracking point in the previous frame of telephoto image is less than a preset threshold value, taking the detection point corresponding to the minimum Euclidean distance as the target tracking point in the next frame of telephoto image, and calculating a motion vector between the detection point corresponding to the minimum Euclidean distance and the target tracking point in the previous frame of telephoto image; and
if the minimum Euclidean distance in the Euclidean distances between each detection point in the next frame of the telephoto image of the telephoto camera and the target tracking point in the previous frame of the telephoto image is greater than the preset threshold value, determining the target tracking point in the next frame of the telephoto image based on the target tracking point in the previous frame of the telephoto image and the motion vector thereof.

2. The method according to claim 1, wherein for inter-camera tracking in the multi-camera system, the method further comprises:
converting the position of the target tracking point of the previous telephoto camera to the coordinate system of the next telephoto camera by utilizing the relative position relationship among the telephoto cameras so as to obtain the starting tracking point of the intra-camera tracking of the next telephoto camera.

3. The method according to claim 2, wherein the converting the position of the target tracking point of the previous telephoto camera to the coordinate system of the next telephoto camera by utilizing the relative position relationship among the telephoto cameras so as to obtain the starting tracking point of the intra-camera tracking of the next telephoto camera is realized by using the following formula:

$$\vec{P}_F = [P_{tx}, P_{ty}, 1]$$

$$\vec{P}_O = H_{FO} \cdot \vec{P}_F^T$$

$$\vec{P}_O = \frac{\vec{P}_O}{P_{Oz}}$$

$$\vec{P}_N = H_{ON} \cdot \vec{P}_O^T$$

$$\vec{P}_N = \frac{\vec{P}_N}{P_{Nz}}$$

$$P'_t = [P_{Nx}, P_{Ny}]$$

wherein, $H_{FO}$ is the homography matrix from the coordinate of the previous telephoto camera to the coordinate of the wide-angle camera in the multi-camera system; $H_{ON}$ is the homography matrix from the coordinate of the wide-angle camera in the multi-camera system to the coordinate of the next telephoto camera; $\vec{P}_F$ is the homogeneous coordinate of the two-dimensional tracking point in the previous telephoto camera, and $P_{tx}$ is the abscissa of the two-dimensional tracking point in the previous telephoto camera; $P_{ty}$ is the ordinate of the two-dimensional tracking point in the previous telephoto camera; $\vec{P}_O$ is the homogeneous coordinate of the two-dimensional tracking point in the wide-angle camera; $\vec{P}_F^T$ is the transposition of $\vec{P}_F$; $P_{Oz}$ is the component z of the homogeneous coordinate $\vec{P}_O$; $\vec{P}_N$ is the homogeneous coordinate of the two-dimensional tracking point in the next telephoto camera; $\vec{P}_O^T$ is the transposition of $\vec{P}_O$; $P_{Nz}$ is the component z of the homogeneous coordinate $\vec{P}_N$; $P'_t$ is the coordinate of the two-dimensional tracking point in the next telephoto camera; and $P_{Nx}$ and $P_{Ny}$ are the abscissa and the ordinate of the two-dimensional tracking point in the next telephoto camera respectively.

4. The method according to claim 1, wherein the connecting the selected target tracking points as a tracking sequence for the starting tracking point comprises:
drawing candidate boxes by taking each target tracking point as a center; and
smoothing the candidate boxes to obtain a tracking sequence for the starting tracking point.

5. The method according to claim 4, wherein for the intra-camera tracking of each of the telephoto cameras in the multi-camera system, the smoothing the candidate box comprises:
smoothing the candidate boxes by polynomial fitting.

6. The method according to claim 4, wherein for inter-camera tracking in the multi-camera system, the smoothing the candidate box comprises:
adjusting the size of the candidate box of the next telephoto camera based on the focal lengths of the previous telephoto camera and the next telephoto camera.

7. The method according to claim 6, wherein the size of the candidate box of the next telephoto camera is adjusted by the following equation:

$$\forall i \in [t, t+N]$$

$$W_i = W_0 \cdot \frac{f_F}{f_N}^{-\frac{N-i+t}{N}}$$

$$H_i = H_0 \cdot \frac{f_F}{f_N}^{-\frac{N-i+t}{N}}$$

wherein, t is a video frame sequence number of the next telephoto camera at the camera switch moment; N is the number of transition video frames at the camera switch moment; i is the traversing sequence number from t to N; $W_i$ is the width of the candidate box in the $i^{th}$ frame; $W_0$ is the width of the candidate box in the previous telephoto camera picture before the switch; $f_F$ is the focal length of the previous telephoto camera; $f_N$ is the focal length of the next telephoto camera; $H_i$ is the height of the candidate box in the $i^{th}$ frame; and $H_0$ is the height of the candidate box in the previous telephoto camera picture before the switch.

8. The method according to claim 1, wherein the method further comprises:

synthesizing the tracking sequences of different objects into the same picture.

9. The method according to claim 8, wherein the synthesizing the tracking sequences of different objects into the same picture comprises:

performing coordinate alignment on the tracking sequences of different objects; and seamlessly stitching the tracking sequences after the coordinate alignment into the same picture.

10. The method according to claim 9, wherein the method further comprises:

extracting the center points of the seamlessly stitched tracking sequence as a tracking point sequence; and performing Gaussian filtering on the tracking point sequence, and performing smooth processing on the seamlessly stitched tracking sequence.

11. A computer readable non-transitory storage medium having computer program stored thereon, wherein the steps of the method according to claim 1 is implemented when the computer program is executed by a processor.

12. An electronic apparatus, comprising:

a memory having a computer program stored thereon; and a processor configured for executing the computer program in the memory to implement the steps of the method according to claim 1.

* * * * *